United States Patent
Iwahashi et al.

(10) Patent No.: US 11,831,513 B2
(45) Date of Patent: Nov. 28, 2023

(54) COMMUNICATION QUALITY MANAGEMENT DEVICE, METHOD, AND PROGRAM FOR ACCOMMODATING USER RESOURCE CONSUMPTION

(71) Applicant: Nippon Telegraph and Telephone Corporation, Tokyo (JP)

(72) Inventors: Hiroki Iwahashi, Musashino (JP); Takayuki Fujiwara, Musashino (JP); Yuta Watanabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/640,199

(22) PCT Filed: Sep. 5, 2019

(86) PCT No.: PCT/JP2019/035077
§ 371 (c)(1),
(2) Date: Mar. 3, 2022

(87) PCT Pub. No.: WO2021/044604
PCT Pub. Date: Mar. 11, 2021

(65) Prior Publication Data
US 2022/0303184 A1    Sep. 22, 2022

(51) Int. Cl.
*G06F 15/177* (2006.01)
*H04L 41/0896* (2022.01)
*H04L 41/0806* (2022.01)

(52) U.S. Cl.
CPC ...... *H04L 41/0896* (2013.01); *H04L 41/0806* (2013.01)

(58) Field of Classification Search
CPC .............. H04L 41/0896; H04L 41/0897
(Continued)

(56) References Cited

U.S. PATENT DOCUMENTS 10,581,736 B1 * 3/2020 Choudhury ......... H04L 43/0876
10,721,176 B2 * 7/2020 Ong ..................... H04L 47/527
(Continued)

FOREIGN PATENT DOCUMENTS

JP    2013034104       2/2013
JP    2013034104 A *  2/2013
(Continued)

OTHER PUBLICATIONS

[No. Author Listed], "ETSI ES 282 003 v1.1.1, Telecommunications and Internet converged Services and Protocols for Advanced Networking (TISPAN); Resource and Admission Control Subsystem (RACS); Functional Architecture," European Telecommunications Standards Institute, Jun. 2006, retrieved from URL <https://www.etsi.org/deliver/etsi_es/282000_282099/282003/01.01.01_60/es_282003v010101p.pdf>, 41 pages.
(Continued)

*Primary Examiner* — Hee Soo Kim
(74) *Attorney, Agent, or Firm* — Fish & Richardson P.C.

(57) ABSTRACT

A collection unit (132) collects information about at least either of user accommodation status and resource consumption status from plural communications devices accommodating users who receive communications services. An estimation unit (131) estimates an amount of resource consumption of a first user for whom an accommodation device is to be determined. A judgment unit (133) judges whether each of the communications devices satisfies a predetermined restricting condition, based on the information collected by the collection unit (132) and the amount of resource consumption of the first user estimated by the estimation unit (131). A determination unit (134) determines a communications device judged by the judgment unit (133) to satisfy the restricting condition among the communications devices, as the accommodation device for the first user.

18 Claims, 6 Drawing Sheets

| AVAILABLE RESOURCES | COMMUNICATIONS DEVICE 21 | COMMUNICATIONS DEVICE 22 | COMMUNICATIONS DEVICE 23 |
|---|---|---|---|
| BANDWIDTH | 100 | 200 | 500 |
| CPU | 30 | 50 | 100 |
| MEMORY | 100 | 200 | 500 |
| NUMBER OF AVAILABLE ACLs | 50 | 100 | 150 |
| UPPER LIMIT ON NUMBER OF PPPoEs | 70 | 100 | 120 |
| UPPER LIMIT ON NUMBER OF VLANs | 40 | 80 | 100 |

(58) Field of Classification Search
USPC .......................................................... 709/222
See application file for complete search history.

(56) References Cited

U.S. PATENT DOCUMENTS

| | | | | |
|---|---|---|---|---|
| 2005/0111487 | A1* | 5/2005 | Matta | ...................... H04L 43/55 |
| | | | | 370/468 |
| 2009/0031013 | A1* | 1/2009 | Kunchipudi | .......... G06F 9/4416 |
| | | | | 709/222 |
| 2014/0122695 | A1* | 5/2014 | Kulikov | .............. H04L 41/5054 |
| | | | | 709/224 |
| 2017/0034717 | A1* | 2/2017 | Yuan | ...................... H04W 24/04 |
| 2019/0245748 | A1* | 8/2019 | Gandhewar | ......... H04L 41/0893 |

FOREIGN PATENT DOCUMENTS

| | | | |
|---|---|---|---|
| JP | 2016054341 | | 4/2016 |
| JP | 2016054341 A | * | 4/2016 |

OTHER PUBLICATIONS

Braden et al., "Resource ReSerVation Protocol (RSVP)—Version 1 Functional Specification," Network Working Group Request for Comments: 2205, Sep. 1997, retrieved from URL <https://tools.ietf.org/html/rfc2205>, 112 pages.

Miyasaka et al., "Bandwidth management control technology in NGN," NTT Technology Journal, 2008, retrieved from URL <http://www.ntt.co.jp/journal/0810/files/jn200810022.pdf>, 20(10): 5 pages (with English Translation).

* cited by examiner

Fig. 3

| AVAILABLE RESOURCES | COMMUNICATIONS DEVICE 21 | COMMUNICATIONS DEVICE 22 | COMMUNICATIONS DEVICE 23 |
|---|---|---|---|
| BANDWIDTH | 100 | 200 | 500 |
| CPU | 30 | 50 | 100 |
| MEMORY | 100 | 200 | 500 |
| NUMBER OF AVAILABLE ACLs | 50 | 100 | 150 |
| UPPER LIMIT ON NUMBER OF PPPoEs | 70 | 100 | 120 |
| UPPER LIMIT ON NUMBER OF VLANs | 40 | 80 | 100 |

Fig. 4

| CONSUMED RESOURCES | USER 41 | USER 42 | USER 43 |
|---|---|---|---|
| BANDWIDTH | 20 | 30 | 14 |
| CPU | 1 | 2 | 4 |
| MEMORY | 3 | 5 | 7 |
| NUMBER OF AVAILABLE ACLs | 4 | 6 | 10 |
| NUMBER OF PPPoEs | 1 | 2 | 5 |
| NUMBER OF VLANs | 1 | 1 | 2 |

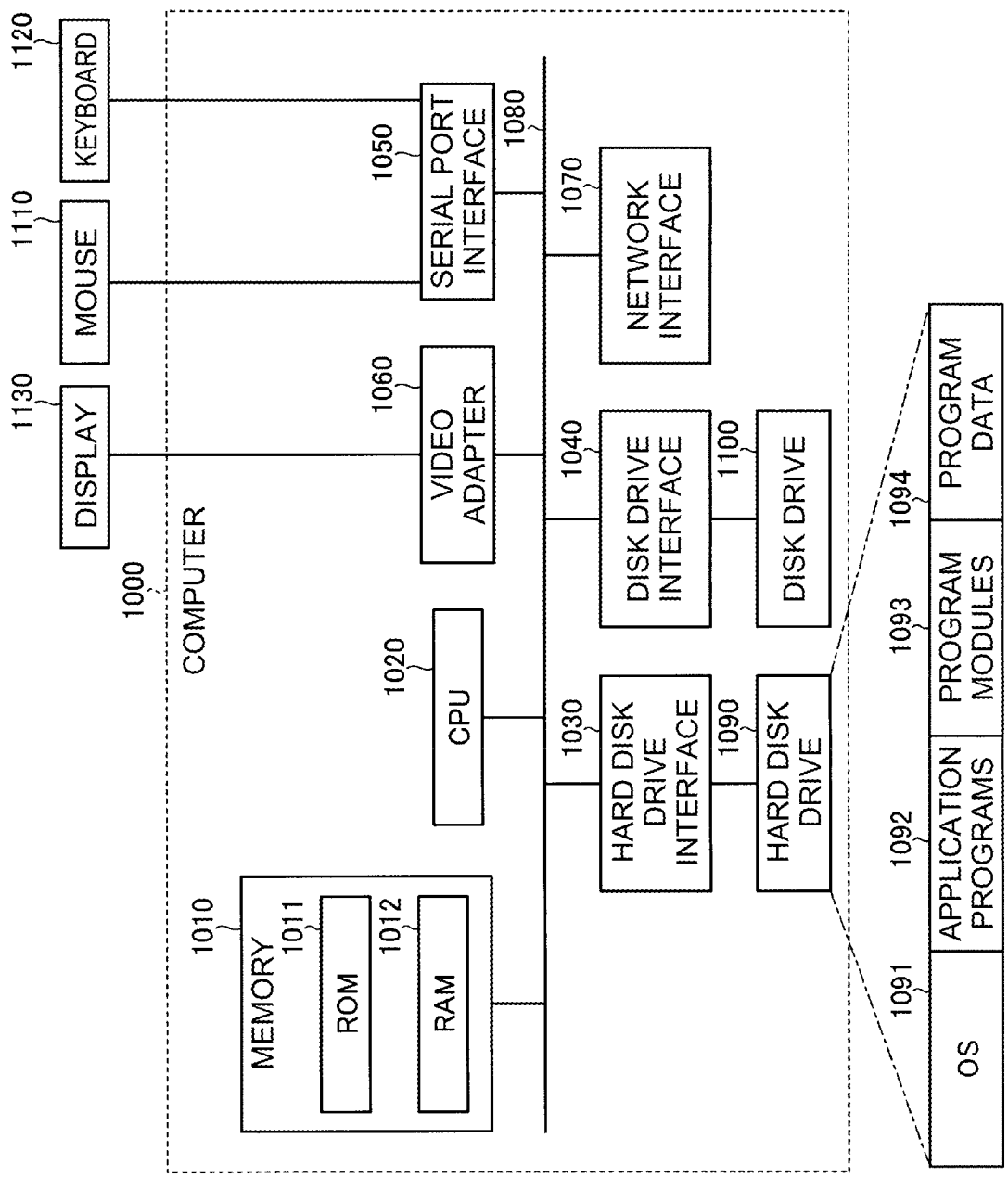

COMMUNICATION QUALITY MANAGEMENT DEVICE, METHOD, AND PROGRAM FOR ACCOMMODATING USER RESOURCE CONSUMPTION

CROSS-REFERENCE TO RELATED APPLICATIONS

This application is a National Stage application under 35 U.S.C. § 371 of International Application No. PCT/JP2019/035077, having an International Filing Date of Sep. 5, 2019, the disclosure of which is considered part of the disclosure of this application, and is incorporated in its entirety into this application.

TECHNICAL FIELD

The present invention relates to a management apparatus, a management method, and a management program.

BACKGROUND ART

Conventionally, as techniques used by network operators to provide services to users while maintaining communications quality at or above a certain level, RACS (Resource and Admission Control Subsystem), RSVP (Resource ReSerVation Protocol), and the like are known. RACS and RSVR maintain communications quality by ensuring a communication band for the users.

For example, with the conventional techniques, a communication band is managed to secure data volume able to be transferred or transmitted per unit time by communications devices making up a network, and when there is leeway in network resources, the user is permitted to start communications, but when there is no leeway, the user is denied permission to start communications.

CITATION LIST

Non-Patent Literature

Non-Patent Literature 1: Miyasaka et al., "Bandwidth Management and Control Technology in the NGN," NTT Technical Journal, 2008.10, found online on the Internet at http://www.ntt.co.jp/journal/0810/files/jn200810022.pdf on Aug. 28, 2019

Non-Patent Literature 2: ETSI ES 282 003 v1.1.1 (2006-06), found online on the Internet at https://www.etsi.org/deliver/etsi_es/282000_282099/282003/01.01.01_60/es_282003v010101p.pdf on Aug. 28, 2019

Non-Patent Literature 3: Resource ReSerVation Protocol (RSVP), found online on the Internet at https://tools.ietf.org/html/rfc2205 on Aug. 28, 2019

SUMMARY OF THE INVENTION

Technical Problem

However, the conventional techniques have a problem in that it sometimes becomes difficult to maintain communications quality. For example, as restrictions on networks, the numbers of firewall filters permitted to be set on devices as well as on communications bands have been prescribed. Therefore, if users are accommodated by the conventional RACS, RSVP, or the like, it is conceivable that communications quality will fall due to factors of the restrictions other than communications bands.

Means for Solving the Problem

To solve the above problem and achieve an object, a management apparatus comprises: a collection unit configured to collect information about at least either of user accommodation status and resource consumption status from a plurality of communications devices accommodating users who receive communications services; an estimation unit configured to estimate an amount of resource consumption of a first user for whom an accommodation device is to be determined; a judgment unit configured to judge whether each of the communications devices satisfies a predetermined restricting condition, based on the information collected by the collection unit and the amount of resource consumption of the first user estimated by the estimation unit; and a determination unit configured to determine a communications device judged by the judgment unit to satisfy the restricting condition among the communications devices, as the accommodation device for the first user.

Effects of the Invention

The present invention makes it possible to accommodate users while maintaining communications quality.

BRIEF DESCRIPTION OF DRAWINGS

FIG. 3 is a diagram showing an example of communications device information.

FIG. 4 is a diagram showing an example of user information.

FIG. 8 is a diagram showing an example of a computer that executes a management program.

DESCRIPTION OF EMBODIMENT

Embodiments of a management apparatus, management method, and management program according to the present invention will be described in detail below with reference to the drawings. Note that the present invention is not limited by the embodiments described below.

[Configuration of First Embodiment]

Figure 1:
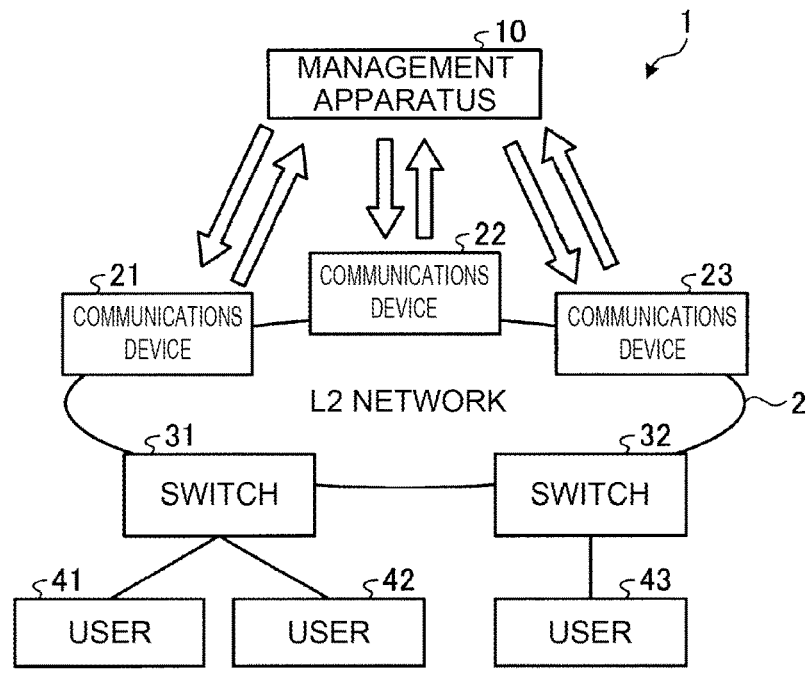
FIG. 1 is a diagram showing a configuration example of a management system.

First, a configuration of a management system according to a first embodiment will be described using FIG. 1. FIG. 1 is a diagram showing a configuration example of the management system. As shown in FIG. 1, the management system 1 includes a management apparatus 10, a communications device 21, a communications device 22, and a communications device 23. Each of the communications devices accommodates users via a switch on an L2 network 2. The communications device is, for example, a router, an SSE (Subscriber Service Edge), and the like. The management apparatus 10 is, for example, a server capable of controlling the communications devices.

It is assumed that a user 41, a user 42, and a user 43 actually are networks, terminals, and the like used by users.

A switch 31 is connected with the user 41 and the user 42. The switch 32 is connected with the user 43.

Figure 2:
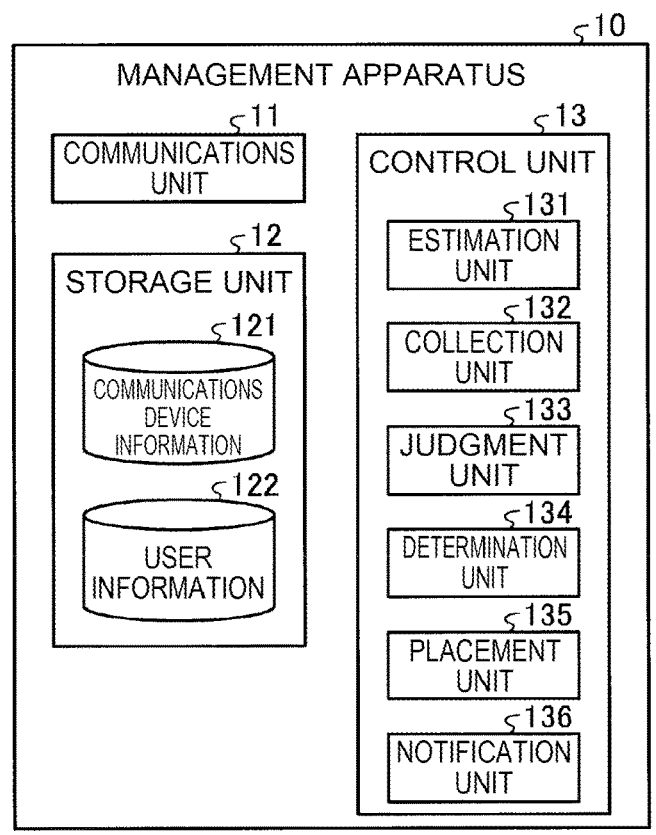
FIG. 2 is a diagram showing a configuration example of a management apparatus.

Next, a configuration of the management apparatus 10 will be described using FIG. 2. FIG. 2 is a diagram showing a configuration example of the management apparatus. As shown in FIG. 2, the management apparatus 10 includes a communications unit 11, a storage unit 12, and a control unit 13.

The communications unit 11 is an interface configured to conduct data communications with other devices. For example, the communications unit 11 conducts data communications with other communications devices. The communications unit 11 can conduct data communications with a non-illustrated operator terminal.

The storage unit 12 is a storage device such as an HDD (Hard Disk Drive), an SSD (Solid State Drive), an optical disk, or the like. Note that the storage unit 12 may be a rewritable semiconductor memory such as a RAM (Random Access Memory), a flash memory, or an NVSRAM (Non-Volatile Static Random Access Memory). The storage unit 12 stores an OS (Operating System) and various programs executed by the management apparatus 10. The storage unit 12 stores communications device information 121 and user information 122.

The communications device information 121 is information about resources of the communications devices. FIG. 3 is a diagram showing an example of the communications device information. As shown in FIG. 3, the communications device information 121 includes the following information about the communications devices: bandwidth, CPU (Central Processing Unit), memory, the number of available ACLs (Access Control Lists), upper limit on the number of PPPoEs, upper limit on the number of VLANs, and the like.

For example, in the example of FIG. 3, the communications device information 121 includes the following information about the communications device 21: the maximum bandwidth is 100 Mbps, the maximum CPU frequency is 30 GHz, the memory capacity is 100 GB, the number of available ACLs is 50, the upper limit on the number of PPPoEs is 70, and the upper limit on the number of VLANs is 40.

The user information 122 is information about resources consumed by each user. FIG. 4 is a diagram showing an example of the user information. As shown in FIG. 4, the user information 122 includes information about the bandwidth, CPU, memory, number of ACL settings, number of PPPoEs, number of VLANs, and the like consumed by each user.

For example, in the example of FIG. 4, the user information 122 indicates that the user 41 consumes a bandwidth of 20 Mbps, a CPU frequency of 1 GHz, a memory amount of 3 GB, four ACL settings, one PPPoE, and one VLAN.

The control unit 13 controls the entire management apparatus 10. The control unit 13 is, for example, an electronic circuit such as a CPU or an MPU (Micro Processing Unit) or an integrated circuit such as an ASIC (Application Specific Integrated Circuit) or an FPGA (Field Programmable Gate Array). The control unit 13 has an internal memory for use to store programs and control data prescribing various processing procedures and performs each process using the internal memory. As various programs operate, the control unit 13 functions as various processing units. For example, the control unit 13 includes an estimation unit 131, a collection unit 132, a judgment unit 133, a determination unit 134, a placement unit 135, and a notification unit 136.

The estimation unit 131 estimates an amount of resource consumption of the user for whom an accommodation device is to be determined. For example, the estimation unit 131 estimates an amount of resource consumption of a user who has newly entered a contract or altered a contract and who is yet to be accommodated.

The management apparatus 10 may periodically relocate accommodated users. In that case, the estimation unit 131 estimates the amounts of resource consumption of the users accommodated in any of the communications devices, in a predetermined time slot.

The estimation unit 131 can estimate the amounts of resource consumption based on contract details for each user, the types and number of devices connecting to the network, previous resource consumption status, and the like.

The collection unit 132 collects information about at least either of user accommodation status and resource consumption status from plural communications devices accommodating users who receive communications services. The collection unit 132 collects information identifying the users accommodated in each of the communications devices and the amount of resource consumption of each user and stores the collected information in the user information 122. The collection unit 132 may periodically collect information about the communications devices and update the communications device information 121.

The judgment unit 133 judges whether each of the communications devices satisfies predetermined restricting conditions, based on the information collected by the collection unit 132 and the amount of resource consumption of a first user estimated by the estimation unit 131. For example, a restricting condition is such that when a user is accommodated in a communications device, the amount of any of the resources consumed in the communications device will not exceed the amount of the resource specified in the communications device information 121. The judgment unit 133 can judge whether the restricting conditions are satisfied, by referring to the communications device information 121 and the user information 122.

Here, when the amount of resource consumption increases, some resources may adversely affect communications quality even if an upper limit value is not reached. For example, although communications quality does not fall when CPU availability of the communications device is around 50%, there may be a case in which the communications quality will start to fall when the availability exceeds 80%. In such a case, for example, by setting a threshold for the CPU availability of the communications device to 80%, a restricting condition may prescribe that the threshold not be exceeded. Resources that can produce such adverse effects are not always stated clearly in operation manuals or the like of the communications device, and thus thresholds are sometimes determined based on a rule of thumb or the like.

On the other hand, if the number of available ACLs of the communications device is 50, this only means that items in excess of the upper limit value cannot be added to the ACL, and it is considered that the communications quality is not affected even if there are any number of ACL settings. Thus, of communications devices, the judgment unit 133 judges any communications device that satisfies certain conditions as satisfying restricting conditions, where the certain conditions are that a total amount of consumption of first resources is equal to or smaller than an upper limit value and a total amount of consumption of second resources is equal to or lower than a predetermined threshold smaller than an upper limit value when the first user is accommodated. In this case, the judgment unit 133 can make judgments in two stages.

The first resources have their upper limits fixed, allow the amounts of consumption to be grasped numerically with users accommodated, and make it possible to easily judge whether the upper limits will be reached. Examples of the first resources include the number of ACL settings, the number of PPPoEs, and the number of VLAN settings. The second resources have upper limits, but cause user communications to be affected before the amounts of consumption reach the upper limits, do not allow the amounts of consumption to be grasped numerically with users accommodated, and do not make it possible to easily judge whether the upper limits will be reached. Examples of the second resources include bandwidth, CPU, and memory.

Here, it is assumed that the threshold is set to 80% the maximum CPU frequency. The CPU frequency of the communications device 21 is 30 GHz as shown in FIG. 3. In this case, if the CPU frequency consumed when a user is accommodated in the communications device 21 exceeds 24 GHz, even if the amounts of consumption of other resources are smaller than the upper limit values, the judgment unit 133 judges that the communications device 21 does not satisfy the restricting condition.

Here, as an example, regarding bandwidth, CPU, and memory, it is assumed that the thresholds are set to 80% the upper limit values. In this case, when the first user is placed on the communications device 21, the judgment unit 133 judges with reference to the communications device information 121 and the user information 122 that the communications device 21 satisfies the restricting conditions if the number of ACL settings is 50 or less, the number of PPPoEs is 70 or less, the number of VLANs is 40 or less, the bandwidth consumed is 80 Mbps or less, the CPU frequency consumed is 24 GHz or less, and the memory consumed is 80 GB or less.

Of the communications devices, the determination unit 134 determines the communications device judged by the judgment unit 133 to satisfy the restricting conditions as an accommodation device for the user. The determination unit 134 can also determine a backup accommodation device. In that case, the determination unit 134 determines a first communications device judged by the judgment unit 133 to satisfy the restricting conditions as an accommodation device for the user and determines a second communications device which is different from the first communications device and is judged by the judgment unit 133 to satisfy the restricting conditions as a backup accommodation device for the first user.

The process of determining a backup accommodation device will be described concretely. Note that if the first communications device enabled with a user actually accommodated therein fails, a configuration file of the user accommodated in the second communications device, which is a backup accommodation device, is enabled.

In determining a backup accommodation device, by assuming that the first communications device has failed and a backup configuration file has been enabled, the estimation unit 131 estimates status of use of each resource on each communications device in that situation. Then, the judgment unit 133 judges whether the estimated status of use satisfies the restricting conditions. Then, the determination unit 134 determines the communications device judged to satisfy the restricting conditions as a second communications device.

Here, items and thresholds of the restricting conditions used in determining a backup accommodation device may be different from items and thresholds of the restricting conditions used in determining an accommodation device for the user. For example, the restricting conditions used in determining a backup accommodation device may be set to "95% the upper limit values of CPU and memory" while the restricting conditions used in determining an accommodation device for the user are set to "80% or less the upper limit values of bandwidth, CPU, and memory" as described above. In this case, the restricting conditions used in determining a backup accommodation device does not include any limit on bandwidth. In this way, the restricting conditions used in determining a backup accommodation device may be milder than the restricting conditions used in determining an accommodation device for the user.

Note that the determination unit 134 may determine the second communications device by selecting from among plural candidate communications devices. In that case, the determination unit 134 may determine the second communications device by preferentially selecting a communications device having the smallest number of backup configuration files or the largest available spaces in the resources from among the candidate communications devices. Besides, the determination unit 134 may determine the second communications device by selecting in turns in round-robin fashion with the previous backup device taken into consideration or by using a method of random extraction.

Furthermore, if there is no candidate backup accommodation device that would satisfy the restricting conditions, the management apparatus 10 may reset the backup accommodation devices for all the users once, and determine backup accommodation communications devices from the beginning. In this case, the management apparatus 10 may determine the backup accommodation communications devices for respective users using a method of solving an optimization problem. In making the determinations, the management apparatus 10 may change the order of users whose backup devices are to be determined from the order used at the time of contract or at the time of the latest backup change.

When the management apparatus 10 relocates an accommodated user, the determination unit 134 determines the accommodation device for the user by selecting a communications device which is judged by the judgment unit 133 to satisfy the restricting conditions and in which the user is not currently accommodated. For example, in relocating the user accommodated in the communications device 21, if the communications device 22 satisfies the restricting conditions, the determination unit 134 can determine the communications device 22 as an accommodation device for the user.

The placement unit 135 places a configuration file of the first user in the accommodation device determined by the determination unit 134. By performing communications control and the like according to the configuration file stored in the communications device, the user can receive communications services. Therefore, for example, when the configuration file of the user is placed in the communications device and enabled, the user has been accommodated in the communications device. If a non-enabled configuration file is stored in a backup communications device, and then enabled when an accommodation communications device for the user fails, communications of the user can be restored quickly.

The notification unit 136 sends predetermined information to an operator and the like. For example, the notification unit 136 notifies that there is no communications device that would satisfy the restricting conditions, that communications devices lack resources needed for backup devices, or the like.

[Flow of Processes]

Figure 5:
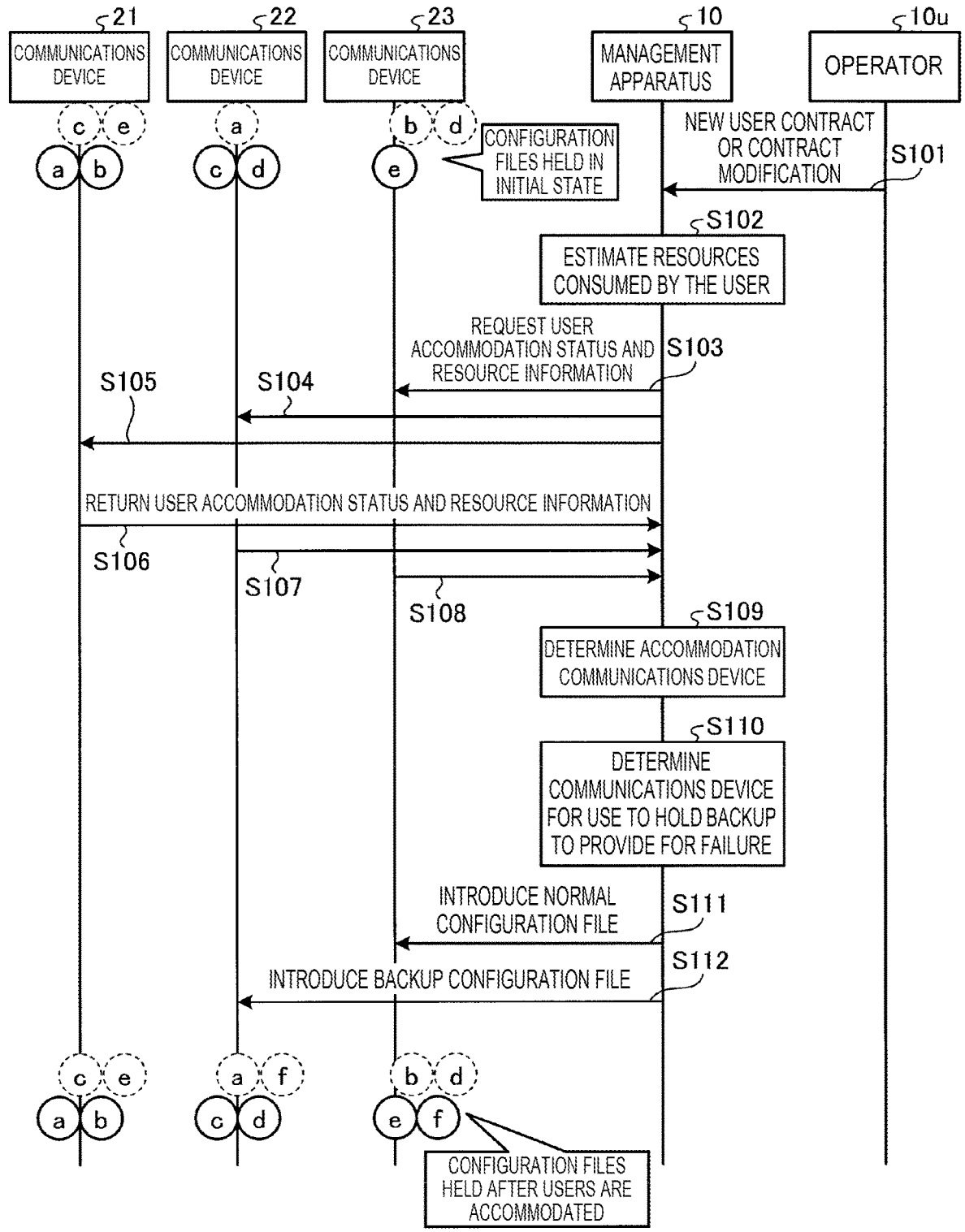
FIG. 5 is a sequence diagram showing a flow of processes for accommodating users.

A flow of processes of the management system 1 will be described using FIG. 5. FIG. 5 is a sequence diagram showing a flow of processes for accommodating users. As shown in FIG. 5, it is assumed that in an initial state, the communications device 21 is an accommodation device for a user a and a user b and a backup device for a user c and a user e. That is, the communications device 21 holds enabled configuration files of the user a and the user b and non-enabled configuration files of the user c and the user e.

Similarly, it is assumed that the communications device 22 is an accommodation device for the user c and the user d and a backup device for the user a. It is assumed that the communications device 23 is an accommodation device for the user e and a backup device for the user b and the user d.

An operator 10u requests the management apparatus 10 to perform a process for a new user contract or a contract modification (step S101). Then, the management apparatus 10 estimates resource consumption of the user (step S102). Here, as an example, it is assumed that a user f is accommodated.

Next, the management apparatus 10 requests each of the communications devices to return user accommodation status and resource information (steps S103, S104, and S105). Each communications device returns user accommodation status and resource information in response to the request from the management apparatus 10 (steps S106, S107, and S108). Consequently, the management apparatus 10 collects user accommodation status and resource consumption status on the communications devices.

Then, the management apparatus 10 judges restricting conditions based on the collected information and determines an accommodation communications device (step S109). Furthermore, the management apparatus 10 determines a communications device for use to hold a backup to provide for a failure of the accommodation communications device (step S110). Here, it is assumed that the management apparatus 10 determines the communications device 23 as an accommodation device for the user f and determines the communications device 21 as a backup device for the user f. Next, the management apparatus 10 introduces a normal configuration file into the communications device 23 (step S111) and introduces a backup configuration file into the communications device (step S112).

Figure 6:
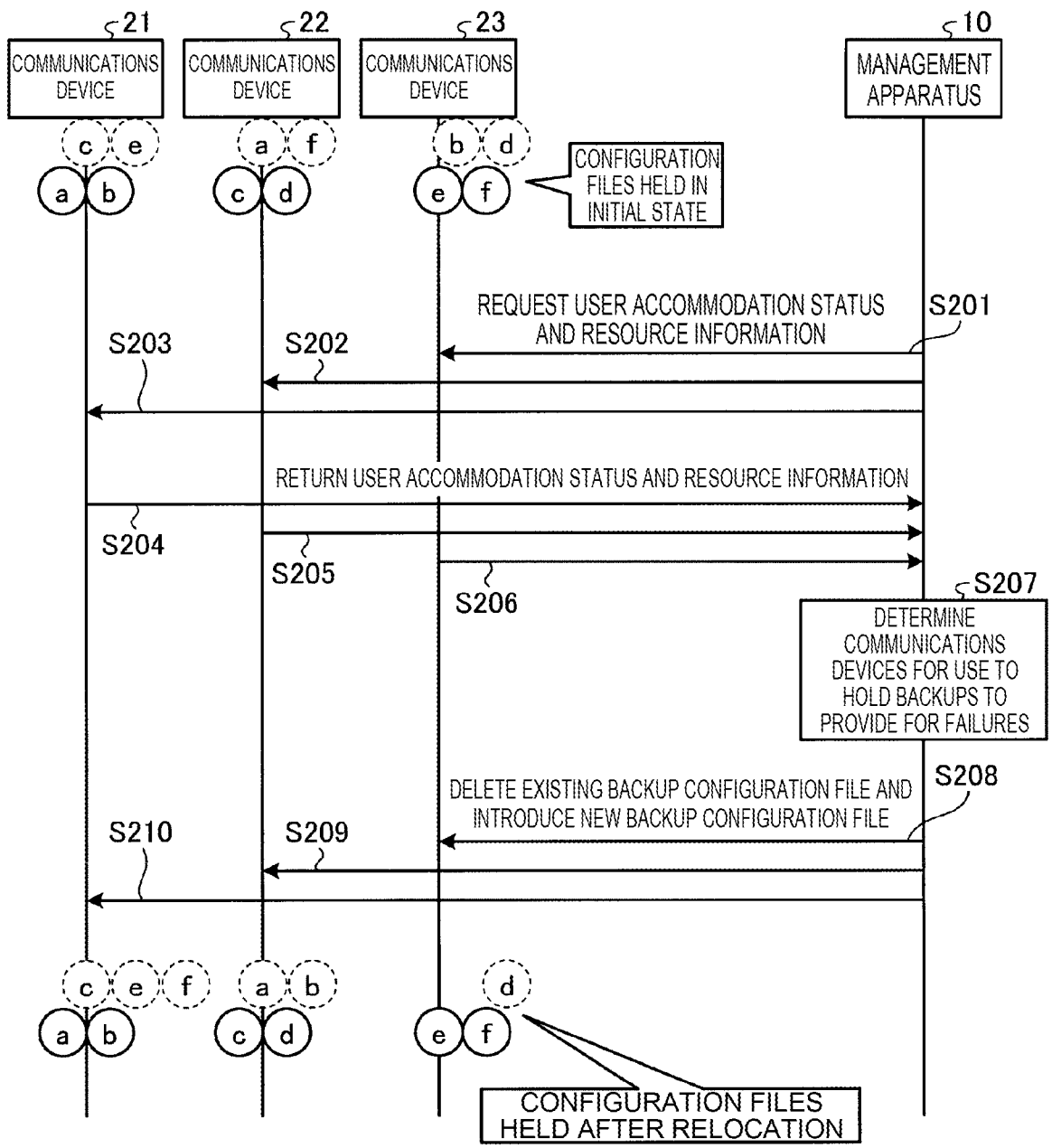
FIG. 6 is a sequence diagram showing a flow of processes for accommodating users.

The process of relocating backups will be described using FIG. 6. FIG. 6 is a sequence diagram showing a flow of processes for accommodating users. A basic flow of processes in this case is similar to the example of FIG. 5. However, relocation is done if the amounts of resource consumption of any of the communications devices reach upper limits or the amounts of resource consumption become greatly unbalanced among communications devices, for example, during peak communication time at night or the like.

As shown in FIG. 6, it is assumed that in an initial state, the communications device 21 is an accommodation device for the user a and the user b and a backup device for the user c and the user e. Also, it is assumed that the communications device 22 is an accommodation device for the user c and the user d and a backup device for the user a and the user f. Besides, it is assumed that the communications device 23 is an accommodation device for the user e and the user f and a backup device for the user b and the user d.

First, when conditions for doing relocation are satisfied, the management apparatus 10 requests each of the communications devices to return user accommodation status and resource information (steps S201, S202, and S203). Each communications device returns user accommodation status and resource information in response to the request from the management apparatus 10 (steps S204, S205, and S206).

Then, the management apparatus 10 determines communications devices for use to hold backups to provide for failures of the communications devices (step S207). Here, it is assumed that the management apparatus 10 determines the communications device 22 as a backup device for the user b and determines the communications device 21 as a backup device for the user f. Next, the management apparatus 10 deletes the backup configuration file of the user b from the communications device 23 (step S208). Then, the management apparatus 10 deletes the backup configuration file of the user f from the communications device 22 and introduces the backup configuration file of the user b into the communications device 22 (step S209). Then, the management apparatus 10 introduces the backup configuration file of the user f into the communications device 21.

Figure 7:
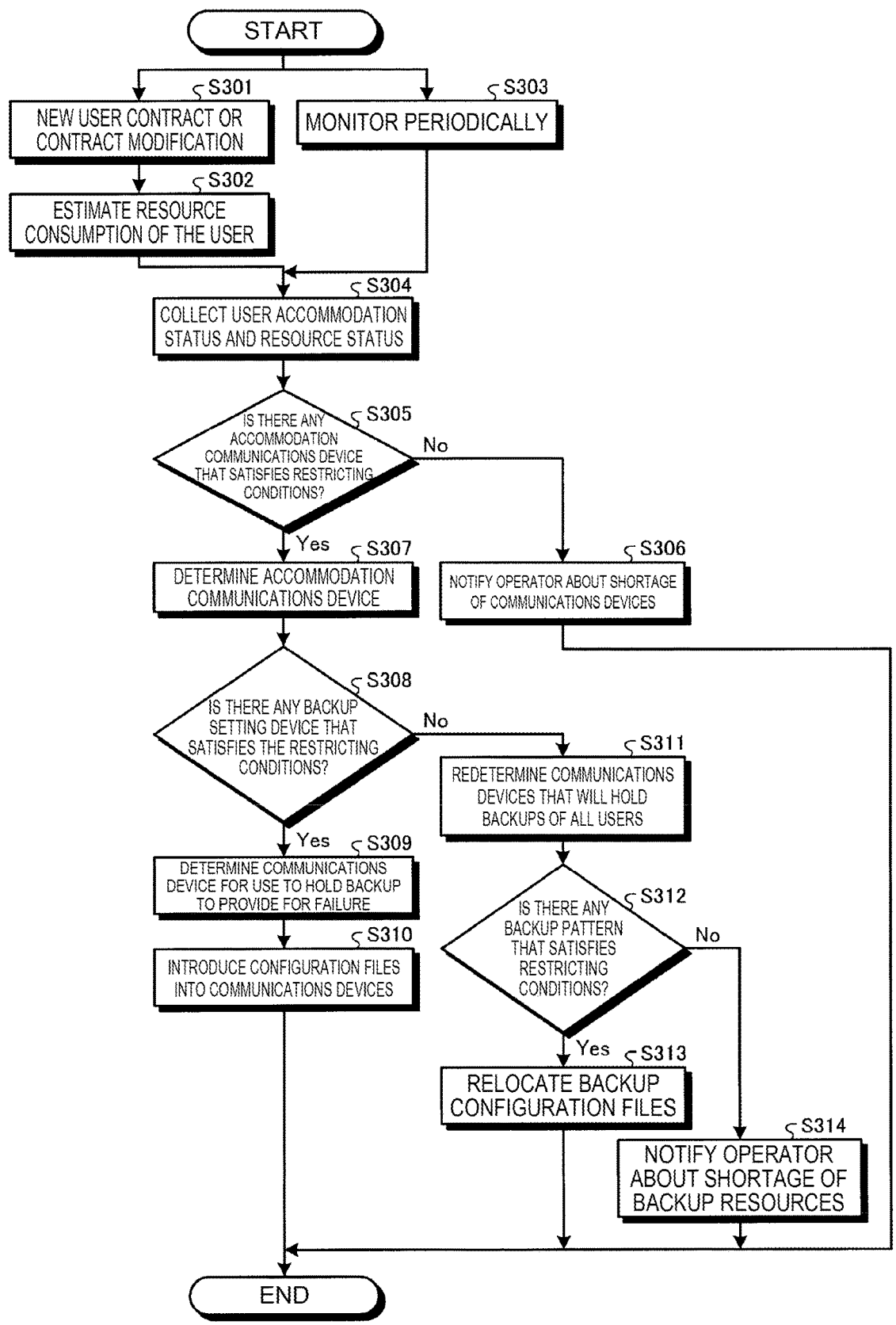
FIG. 7 is a flowchart showing a flow of processes of the management apparatus.

A flow of processes of the management apparatus 10 will be described using FIG. 7. FIG. 7 is a flowchart showing a flow of processes of the management apparatus. As shown in FIG. 7, the management apparatus 10 accepts a request for a process concerning a new user contract or a contract modification (step S301). Then, the management apparatus 10 estimates resource consumption of the user (step S302). At the same time, the management apparatus 10 periodically monitors each of the communications devices and judges whether to relocate the users (step S303).

The management apparatus 10 collects user accommodation status and resource status of each of the communications devices (step S304). Then, the management apparatus 10 judges whether there is any accommodation communications device that satisfies the restricting conditions (step S305). If there is no accommodation communications device that would satisfy the restricting conditions (No in step S305), the management apparatus 10 notifies the operator about the shortage of communications devices (step S306). On the other hand, if there is any accommodation communications device that satisfies the restricting conditions (Yes in step S305), the management apparatus 10 determines the accommodation communications device (step S307).

Furthermore, the management apparatus 10 judges whether there is any backup communications device that satisfies the restricting conditions (step S308). Note that the restricting conditions in step S308 may be milder than the restricting conditions in step S305. If there is any backup communications device (Yes in step S308), the management apparatus 10 determines a communications device for use to hold a backup to provide for a failure (step S309). In so doing, the management apparatus 10 may determine the communications device for use to hold the backup, by selecting by a predetermined method from among plural candidates judged in step S305 as being present. Then, the management apparatus 10 introduces the configuration files into the respective communications devices determined in steps S307 and S310 (step S310).

On the other hand, if there is no backup communications device (No in step S308), the management apparatus 10 redetermines communications devices that will hold backups of all users (step S311). For example, by assuming a state in which all existing backup configuration files have been deleted, the management apparatus 10 judges the restricting conditions of the communications devices and searches for a placement pattern of backups (backup pattern).

If there is no backup pattern (No in step S312), the management apparatus 10 notifies the operator about the shortage of backup resources (step S314). If there is any backup pattern (Yes in step S312), the management apparatus 10 relocates backup configuration files according to the backup pattern (step S313).

[Effects of First Embodiment]

As described so far, the collection unit 132 of the management apparatus 10 collects information about at least either of user accommodation status and resource consumption status from plural communications devices accommodating users who receive communications services. The estimation unit 131 estimates an amount of resource consumption of a first user for whom an accommodation device is to be determined. The judgment unit 133 judges whether each of the communications devices satisfies predetermined restricting conditions, based on the information collected by the collection unit 132 and the amount of resource consumption of the first user estimated by the estimation unit 131. The determination unit 134 determines the accommodation device for the first user by selecting a communications device which is judged by the judgment unit 133 to satisfy the restricting conditions. In this way, the management apparatus 10 can determine an accommodation device for the user by taking into consideration not only bandwidth, but also pluralistic restrictions. Therefore, the first embodiment makes it possible to accommodate users while maintaining communications quality.

The placement unit 135 places a configuration file of the first user in the accommodation device determined by the determination unit 134. This makes it possible to easily place the user in the accommodation device determined by the determination unit 134.

Of communications devices, the judgment unit 133 judges any communications device that satisfies certain conditions as satisfying restricting conditions, where the certain conditions are that a total amount of consumption of first resources is equal to or smaller than an upper limit value and a total amount of consumption of second resources is equal to or lower than a predetermined threshold smaller than an upper limit value when the first user is accommodated. Even if the upper limit value is not reached, the accommodation device can be determined by giving consideration to resources such that communications quality will be adversely affected.

The determination unit 134 determines a first communications device judged by the judgment unit 133 to satisfy the restricting conditions as the accommodation device for the first user and determines a second communications device judged by the judgment unit 133 to satisfy the restricting conditions as a backup accommodation device for the first user, where the second communications device is different from the first communications device. In this way, if backups are scattered even if an accommodation communications device fails, communications can be restored quickly while maintaining communications quality.

The estimation unit 131 estimates the amounts of resource consumption of the first user accommodated in any of the communications devices, in a predetermined time slot. The determination unit 134 determines the accommodation device for the first user by selecting a communications device which is judged by the judgment unit 133 to satisfy the restricting conditions and in which the first user is not currently accommodated. This makes it possible to constantly maintain communications quality that satisfies restrictions.

The restricting conditions used in determining a backup accommodation device may be milder than the restricting conditions used in determining an accommodation device for the user. This will make it possible to more reliably ensure the user's accommodation and communications in case of failure.

[System Configuration, Etc.]

The components of the illustrated apparatuses/devices are based on functional concepts and do not necessarily have to be physically configured as illustrated. That is, concrete distributed or integrated forms of apparatuses/devices are not limited to the illustrated ones, and all or part of the apparatuses/devices can be mechanically or physically distributed or integrated in any units according to various loads, status of use, or the like. Furthermore, all or any part of the processing functions of the apparatuses/devices can be implemented by a CPU or by programs analyzed and executed by the CPU or implemented as wired-logic hardware.

Of the processes described in the present embodiment, all or part of the processes described as being performed automatically may be performed manually or all or part of the processes described as being performed manually may be performed automatically by a publicly known method. Besides, information including processing procedures, control procedures, concrete names, and various data and parameters described above in the text and drawings may be changed as desired unless otherwise indicated.

[Program]

As an embodiment, the management apparatus 10 can be implemented by installing a management program configured to perform the management process on a desired computer as packaged software or online software. For example, if the management program is run on an information processing apparatus, the information processing apparatus can be caused to function as the management apparatus 10. The information processing apparatus referred to herein include a desktop personal computer or a laptop personal computer. Besides, the category of the information processing apparatus includes mobile communications terminals such as a smart phone, a cellular phone, and a PHS (Personal Handyphone System) as well as slate terminals such as PDA (Personal Digital Assistant).

The management apparatus 10 can also be implemented as a management server configured to provide services related to the management process described above to a client, which is a terminal device used by the user. For example, a management server device can be implemented as a server device configured to provide a management service of accepting information about communications devices as input and outputting a determined accommodation device of the user. In this case, the management server device may be implemented as a Web server or implemented in the cloud to provide the services related to the management process by outsourcing.

FIG. 8 is a diagram showing an example of the computer that executes the management program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These components are interconnected via a bus 1080.

The memory 1010 includes a ROM (Read Only Memory) 1011 and a RAM 1012. The ROM 1011 stores, for example, a boot program such as BIOS (BASIC Input Output System). The hard disk drive interface 1030 is connected to a hard disk drive 1090. The disk drive interface 1040 is connected to a disk drive 1100. A removable storage medium such as a magnetic disk or an optical disk is inserted into the disk drive 1100. The serial port interface 1050 is connected, for example, to a mouse 1110 or a keyboard 1120. The video adapter 1060 is connected, for example, to a display 1130.

The hard disk drive 1090 stores, for example, an OS 1091, application programs 1092, program modules 1093, and program data 1094. That is, a program prescribing processes of the management apparatus 10 is implemented as program modules 1093 in which computer-executable code is described. The program modules 1093 are stored, for example, on the hard disk drive 1090. For example, program modules 1093 intended to perform processes similar to those of functional components of the management apparatus 10 are stored on the hard disk drive 1090. Note that the hard disk drive 1090 may be substituted by an SSD.

The setting data used in the processes of the above embodiment are stored, for example, in the memory 1010 or the hard disk drive 1090 as the program data 1094. Then, the CPU 1020 performs the processes of the above embodiment by reading the program modules 1093 and the program data 1094, as required, out of the memory 1010 or the hard disk drive 1090 into RAM 1012.

Note that the program modules 1093 and the program data 1094 are not only stored on the hard disk drive 1090, but also may be stored, for example, on a removable storage medium and read out by the CPU 1020 via the disk drive 1100 or the like. Alternatively, the program modules 1093 and program data 1094 may be stored on another computer connected via a network (LAN (Local Area Network), WAN (Wide Area Network), or the like). Then, the program modules 1093 and program data 1094 may be read out of the other computer by the CPU 1020 via the network interface 1070.

REFERENCE SIGNS LIST

1 Management system
10 Management apparatus
11 Communications unit
12 Storage unit
13 Control unit
21, 22, 23 Communications device
31, 32 Switch
41, 42, 43 User
121 Communications device information
122 User information
131 Estimation unit
132 Collection unit
133 Judgment unit
134 Determination unit
135 Placement unit
136 Notification unit

The invention claimed is:

1. A management apparatus comprising:
a processor configured to:
collect, from a plurality of communications devices to which a plurality of users receiving communications services are assigned, information regarding user accommodation status and resource consumption status;
estimate an amount of resource consumption of a first user for whom an accommodation device is to be determined;
determine whether each of the plurality of communications devices satisfies a first predetermined restricting condition, based on the collected information and the estimated amount of resource consumption of the first user; and
determine a communications device, among the plurality of communication devices, that satisfies the first predetermined restricting condition, as the accommodation device for the first user,
wherein the processor is configured to determine that the first predetermined restriction condition is satisfied based on (i) a total amount of consumption of first resources being equal to or less than a first upper limit value and (ii) a total amount of consumption of second resources being equal to or less than a predetermined threshold that is less than a second upper limit value, when the first user is accommodated.

2. The management apparatus according to claim 1, wherein the processor is configured to place a configuration file of the first user in the determined accommodation device.

3. The management apparatus according to claim 1, wherein the processor is configured to determine (i) a first communications device determined to satisfy the first predetermined restricting condition as the accommodation device for the first user and (ii) a second communications device that is different from the first communications device and that is determined to satisfy the first predetermined restricting condition as a backup accommodation device for the first user.

4. The management apparatus according to claim 1, wherein the processor is configured to:
in a predetermined time slot, estimate the amount of resource consumption of the first user accommodated in any of the communications devices, and
determine the accommodation device for the first user by selecting a communications device which is determined to satisfy the first predetermined restricting condition and in which the first user is not currently accommodated.

5. The management apparatus according to claim 1, wherein the processor is configured to determine the accommodation device for the first user by selecting another communications device (i) which is determined to satisfy a second predetermined restricting condition having a threshold less than a threshold of the first predetermined restricting condition and (ii) in which the first user is not currently accommodated.

6. A management method performed by a computer, the method comprising:
collecting, from a plurality of communications devices to which a plurality of users receiving communications services are assigned, information regarding user accommodation status and resource consumption status;
estimating an amount of resource consumption of a first user for whom an accommodation device is to be determined;
determining whether each of the plurality of communications devices satisfies a first predetermined restricting condition, based on the collected information collected and the estimated amount of resource consumption of the first user; and
determining a communications device, among the plurality of communication devices, that satisfies the first predetermined restricting condition, as the accommodation device for the first user, wherein the first predetermined restricting condition is satisfied based on (i) a total amount of consumption of first resources being equal to or less than a first upper limit value and (ii) a total amount of consumption of second resources being equal to or less than a predetermined threshold that is less than a second upper limit value, when the first user is accommodated.

7. A non-transitory recording medium storing a management program, wherein execution of the program causes one or more computing devices to perform operations comprising:
collecting, from a plurality of communications devices to which a plurality of users receiving communications services are assigned, information regarding user accommodation status and resource consumption status;
estimating an amount of resource consumption of a first user for whom an accommodation device is to be determined;
determining whether each of the plurality of communications devices satisfies a first predetermined restricting condition, based on the collected information and the estimated amount of resource consumption of the first user; and
determining a communications device, among the plurality of communication devices, that satisfies the first predetermined restricting condition, as the accommodation device for the first user,
wherein the first predetermined restricting condition is satisfied based on (i) a total amount of consumption of first resources being equal to or less than a first upper limit value and (ii) a total amount of consumption of second resources being equal to or less than a predetermined threshold that is less than a second upper limit value, when the first user is accommodated.

8. The recording medium according to claim 7, wherein the operations further comprise placing a configuration file of the first user in the determined accommodation device.

9. The recording medium according to claim 7, wherein determining a communications device as the accommodation device comprises determining (i) a first communications device determined to satisfy the first predetermined restricting condition as the accommodation device for the first user and (ii) a second communications device that is different from the first communications device and that is determined to satisfy the first predetermined restricting condition as a backup accommodation device for the first user.

10. The recording medium according to claim 7,
wherein estimating the amount of resource consumption of the first user comprises, in a predetermined time slot, estimating the amount of resource consumption of the first user accommodated in any of the communications devices, and
wherein determining the accommodation device for the first user comprises determining the accommodation device for the first user by selecting a communications device which is determined to satisfy the first predetermined restricting condition and in which the first user is not currently accommodated.

11. The recording medium according to claim 7, wherein determining the accommodation device for the first user comprises determining the accommodation device for the first user by selecting another communications device (i) which is determined to satisfy a second predetermined restricting condition having a threshold less than a threshold of the first predetermined restricting condition and (ii) in which the first user is not currently accommodated.

12. The management apparatus according to claim 1, wherein the first resources include a number of access control lists (ACL) settings, a number of point-to-point protocol over Ethernets (PPPoE), and a number of virtual local area network (VLAN) settings, and the second resources include a bandwidth, a maximum central processing unit (CPU) frequency, and an amount of memory available for allocation to new or existing processes.

13. The management method according to claim 6, wherein the first resources include a number of access control lists (ACL) settings, a number of point-to-point protocol over Ethernets (PPPoE), and a number of virtual local area network (VLAN) settings, and the second resources include a bandwidth, a maximum central processing unit (CPU) frequency, and an amount of memory available for allocation to new or existing processes.

14. The management method according to claim 6, further comprising placing a configuration file of the first user in the determined accommodation device.

15. The management method according to claim 6, wherein determining a communications device as the accommodation device comprises determining (i) a first communications device determined to satisfy the first predetermined restricting condition as the accommodation device for the first user and (ii) a second communications device that is different from the first communications device and that is determined to satisfy the first predetermined restricting condition as a backup accommodation device for the first user.

16. The management method according to claim 6,
wherein estimating the amount of resource consumption of the first user comprises, in a predetermined time slot, estimating the amount of resource consumption of the first user accommodated in any of the communications devices, and
wherein determining the accommodation device for the first user comprises determining the accommodation device for the first user by selecting a communications device which is determined to satisfy the first predetermined restricting condition and in which the first user is not currently accommodated.

17. The management method according to claim 6, wherein determining the accommodation device for the first user comprises determining the accommodation device for the first user by selecting another communications device (i) which is determined to satisfy a second predetermined restricting condition having a threshold less than a threshold of the first predetermined restricting condition and (ii) in which the first user is not currently accommodated.

18. The recording medium according to claim 7, wherein the first resources include a number of access control lists (ACL) settings, a number of point-to-point protocol over Ethernets (PPPoE), and a number of virtual local area network (VLAN) settings, and the second resources include a bandwidth, a maximum central processing unit (CPU) frequency, and an amount of memory available for allocation to new or existing processes.

* * * * *